United States Patent [19]
Hainaut et al.

[11] 3,908,015
[45] Sept. 23, 1975

[54] CERTAIN MONOUNSATURATED ESTERS USED TO CONTROL INSECTS

[75] Inventors: Daniel Hainaut, Villemomble; Jean-Pierre Demoute, Montreuil-sous-Bois, both of France

[73] Assignee: Roussel-UCLAF, Paris, France

[22] Filed: July 3, 1974

[21] Appl. No.: 485,386

[30] Foreign Application Priority Data
July 13, 1973 France .................. 73.25760

[52] U.S. Cl. .................. 424/278; 424/312
[51] Int. Cl.² .................. A01N 9/24; A01N 9/28
[58] Field of Search .................. 424/278, 312

[56] References Cited
UNITED STATES PATENTS
3,749,743 7/1973 Siddall et al. .................. 424/312 X
3,821,264 6/1974 Henrick .................. 424/312 X FOREIGN PATENTS OR APPLICATIONS
2,085,652 12/1971 France OTHER PUBLICATIONS
Borkovec–"Insect Chemosterilants," pp. 61–63 (1966).

Primary Examiner—Albert T. Meyers
Assistant Examiner—Leonard Schenkman
Attorney, Agent, or Firm—Hammond & Littell

[57] ABSTRACT

Novel insecticidal compositions and method wherein the active ingredient is an unsaturated β-keto ester of the formula

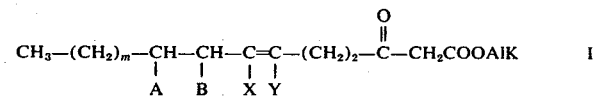

wherein A is selected from the group consisting of chlorine and bromine, B is hydroxy and A and B together form an epoxide, X and Y are hydrogen or indicate another bond between the carbon atoms to which they are attached, Alk is alkyl of 1 to 8 carbon atoms and m is 3,4 or 5 with the proviso that X and Y are hydrogen when A and B form an epoxide.

5 Claims, No Drawings

CERTAIN MONOUNSATURATED ESTERS USED TO CONTROL INSECTS

STATE OF THE ART

The products of formula I are described in French Pat. No. 2,085,652 as being useful intermediates for the preparation of prostaglandins.

OBJECTS OF THE INVENTION

It is an object of the invention to provide novel insecticidal compositions with the compounds of formula I as the active ingredient.

It is a further object of the invention to provide a novel method of killing insects.

These and other objects and advantages of the invention will become obvious from the following detailed description.

THE INVENTION

The novel insecticidal compositions of the invention are comprised of an insecticidally effective amount of at least one compound of the formula

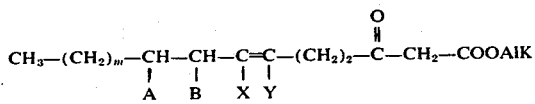

wherein A is selected from the group consisting of chlorine and bromine, B is hydroxy and A and B together form an epoxide, X and Y are hydrogen or indicate another bond between the carbon atoms to which they are attached, AlK is alkyl of 1 to 8 carbon atoms and $m$ is 3, 4 or 5 with the proviso that X and Y are hydrogen when A and B form an epoxide and an insecticidal carrier. The compositions may contain 1 to 99% by weight of the active ingredient.

The insecticidal compositions may be in the form of powders, granules, suspensions, emulsions or solutions containing the active ingredients, for example in admixture with a vehicle and/or a cationic, anionic or non-ionic surface-active agent to ensure among other things a uniform dispersion of the substances of the compositions.

The vehicle may be a liquid such as water, alcohol, hydrocarbons or other organic solvents, a mineral, animal or vegetable oil or a powder such as talc, clays, silicates or Kieselguhr. The insecticidal compositions for spraying foliage preferably contain 10 to 80% by weight of the active ingredient.

Among the compounds of formula I, ethyl 3-oxo-8-hydroxy-9-chloro-6-tetradecynoate, ethyl 3-oxo-8-hydroxy-9-chloro-cis 6-tetradecenoate and ethyl 3-oxo-trans 8,9-epoxy-cis 6-tetradecenoate are preferred.

An example of a suitable insecticidal composition of the invention in the form of an emulsifiable concentrate is 10% by weight of ethyl 3-oxo-8-hydroxy-9-chloro-cis 6-tetradecenoate, 4% by weight of Atlox 4851 (oxyethylene triglyceride combined with a sulfonate having an acid No. of 1.5), 6% by weight of Atlox 4855 (oxyethylene triglyceride combined with a sulfonate having an acid No. of 3), 40% by weight of xylene and 40% by weight of cyclohexanone.

The insecticidal compositions of the invention have remarkable properties and are particularly active against larvae and pupa but are equally active in a very efficacious fashion no matter what the development stage of the insects. When treating the larvae form of the insects with the compositions of the invention, the developement of the larvae is incomplete. This is ascertained notably by the formation of giant larvae possessing malformations with the results, in general, that the normal adult stage is not reached. When in the exceptional case the larvae result in a normal appearing adult, the individual insect is sterile.

Tests have shown that the products are active against *Dysdercus intermedius*, *Tenebrio molitor*, *Aedes aegypti* and *Spodoptera littoralis*.

The novel method of combatting insects comprises contacting insects with an insecticidal amount of at least one compound of formula I. The insects may be in any stage of development.

In the following examples there are described several preferred embodiments to illustrate the invention. However, it should be understood that the invention is not intended to limited to the specific embodiments.

EXAMPLE 1

Ethyl 3-oxo-8-hydroxy-9-chloro-6-tetradecynoate (compound A), ethyl 3-oxo-8-hydroxy-9-chloro-cis 6-tetradecenoate (compound B) and ethyl 3-oxo-trans 8,9-epoxy-cis 6-tetradecenoate (compound C) were tested against larvae in the last stage of *Dysdercus intermedius* and nymphs of *Tenebrio molitor*. The treatment was effected by topical application to the abdominal tergites of the larvae and to the last 3 abdominal segments of the nymphs. The treatment was effected with acetone solutions containing 20, 2 and 0.2 g per liter of the active ingredient and 5 μl of the solution was applied to each insect for an effective dose of 100, 10 and 1 μg of active compound. 10 insects were used for each dose and effected a test in parallel with non-treated larvae and nymphs.

On the day of the molting of the control insects, the treated larvae and nymphs were examined aand rated on a scale of 0 to 5 with 0 corresponding to obtaining normally appearing adult insects and 5 corresponding to giant larvae or a second nymph not able to transform into an adult. The following Table reports the average values of 10 treated insects compared to non-treated controls.

TABLE

| Product | Dysdercus intermedius | Tenebrio molitor |
|---------|----------------------|------------------|
| A | 5 at 100 μg | — |
| B | 5 at 10 μg | 3 at 100 μg |
| | | 1.4 at 10 μg |
| | | 0.3 at 1 μg |
| C | 4.3 at 100 μg | 3 at 100 μg |
| | 2 at 10 μg | 2.5 at 10 μg |
| | 0.2 at 1 μg | 0 at 1 μg |

EXAMPLE 2

Products A and B were tested against larvae of *Spodoptera littoralis* and *Aedes aegypti*. The product was administered topically on *Spodoptera littoralis* and on *Aedes aegypti* the treatment is directed to the water destined to receive the larvae. The percentage of larvae dead after 7 days was calculated. Product A killed 30% of *Aedes aegypti* at 10 μg and product B killed 7% of *Spodoptera littoralis* at 100 μg.

Various modifications of the compositions and method of the invention may be made without departing from the spirit or scope thereof and it should be understood that the invention is to be limited only as defined in the appended claims.

We claim:

1. A method of killing insects comprising contacting insects with an insecticidally effective amount of at least one compound of the formula

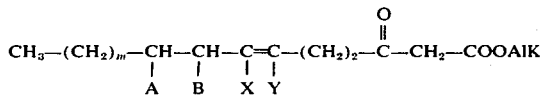

wherein A is selected from the group consisting of chlorine and bromine, B is hydroxy or A and B together form the epoxide, X and Y are hydrogen or indicate another bond between the carbon atoms to which they are attached, AlK is alkyl of 1 to 8 carbon atoms and $m$ is 3, 4 or 5 with the proviso that X and Y are hydrogen when A and B form the epoxide.

2. The method of claim 1 wherein the active compound is ethyl 3-oxo-8-hydroxy-9-chloro-6-tetradecynoate.

3. The method of claim 1 wherein the active compound is ethyl 3-oxo-8-hydroxy-9-chloro- cis 6-tetradecenoate.

4. The method of claim 1 wherein the active compound is ethyl 3-oxo-trans 8,9-epoxy-cis 6-tetradecenoate.

5. The method of claim 1 wherein the insects are in the larvae stage.

* * * * *